(12) United States Patent
Salo

(10) Patent No.: US 11,526,710 B1
(45) Date of Patent: Dec. 13, 2022

(54) SYSTEMS AND METHODS FOR PROMISSORY IMAGE CLASSIFICATION

(71) Applicant: Proofpoint, Inc., Sunnyvale, CA (US)

(72) Inventor: Daniel Clark Salo, Durham, NC (US)

(73) Assignee: Proofpoint, Inc., Sunnyvale, CA (US)

( * ) Notice: Subject to any disclaimer, the term of this patent is extended or adjusted under 35 U.S.C. 154(b) by 123 days.

(21) Appl. No.: 16/825,901

(22) Filed: Mar. 20, 2020

Related U.S. Application Data

(60) Provisional application No. 62/955,607, filed on Dec. 31, 2019.

(51) Int. Cl.
*G06K 9/62* (2022.01)
*G06V 30/40* (2022.01)

(52) U.S. Cl.
CPC .......... *G06K 9/6284* (2013.01); *G06K 9/627* (2013.01); *G06K 9/6256* (2013.01); *G06V 30/40* (2022.01)

(58) Field of Classification Search
CPC ........ G06N 3/08; G06N 3/0454; G06N 20/00; G06T 2207/20081; G06T 2207/20084; G06K 9/6256
See application file for complete search history.

(56) References Cited

U.S. PATENT DOCUMENTS 10,699,226 B1 * 6/2020 Lyons ............ G06Q 10/063114
2011/0320454 A1 * 12/2011 Hill ........................ G06N 20/00
707/739

* cited by examiner

*Primary Examiner* — Ross Varndell
(74) *Attorney, Agent, or Firm* — Sprinkle IP Law Group

(57) ABSTRACT

Systems, methods and products for classifying images according to a visual concept where, in one embodiment, a system includes an object detector and a visual concept classifier, the object detector being configured to detect objects depicted in an image and generate a corresponding object data set identifying the objects and containing information associated with each of the objects, the visual concept classifier being configured to examine the object data set generated by the object detector, detect combinations of the information in the object data set that are high-precision indicators of the designated visual concept being contained in the image, generate a classification for the object data set with respect to the designated visual concept, and associate the classification with the image, wherein the classification identifies the image as either containing the designated visual concept or not containing the designated visual concept.

17 Claims, 10 Drawing Sheets

SYSTEMS AND METHODS FOR PROMISSORY IMAGE CLASSIFICATION

CROSS-REFERENCE TO RELATED APPLICATION(S)

This application claims a benefit of priority under 35 U.S.C. § 119(e) from U.S. Provisional Application No. 62/955,607, filed Dec. 31, 2019, entitled "SYSTEMS AND METHODS FOR PROMISSORY IMAGE CLASSIFICATION", which is incorporated by reference herein for all purposes.

FIELD OF THE INVENTION

This invention relates generally to image analysis and classification. More particularly, this invention relates to an image classification technology that uniquely combines object detection and machine learning in processing image data and automatically programmatically identifying a visual concept such as a fiduciary promise that might be interpreted as such by viewers of the image data.

BACKGROUND OF THE RELATED ART

"Fiduciary" refers to an individual organization that holds a position of trust and has a responsibility to act in the best interests of another. For instance, an individual or organization that manages assets on behalf of another person or entity (the beneficiary) has a responsibility to manage those assets in the best interests of the beneficiary. A fiduciary such as a financial manager may be held, by law, to provide the highest standards of care to its clients, placing client interests above those of the fiduciary.

If someone in the position of a fiduciary makes a promise as a fiduciary, they may be obligated to fulfill that promise, even though it may be incredibly difficult and expensive, or even impossible. Thus, fiduciary organizations such as those that provide financial services may wish to avoid making fiduciary promises, such as guaranteeing a particular return on an investment. One way for fiduciary organizations to avoid making fiduciary promises is to restrict the content of communications between financial advisors within these organizations and their clients or prospective clients.

When a communication between a financial advisor and their client or prospective client occurs in writing, a text classifier may be used to facilitate a review of the communication and/or removal of any undesirable and/or unnecessary fiduciary promises in the textual content. However, a fiduciary promise may also be made, either explicitly or implicitly, in an image. For instance, an image may depict a person holding sacks of money, or an upward-trending graph with stacks of dollar bills at the end. If a person whose assets are being managed by a financial advisor receives a communication from the financial advisor containing this type of image, that person may interpret the image as a promise of a large profit on an investment.

Ideally, both the textual content and the image content of communications should be examined to ensure that no fiduciary promises are made. Unfortunately, while classifiers that exist in the market today may be able to identify fiduciary promises in textual content, they are not capable of identifying potential promissory imagery (e.g., a fiduciary promise conveyed through textual and/or non-textual content in an image). Further, while it might be possible for a person to review a particular image to determine whether the image contains promissory imagery, the volume of communications that must be reviewed makes it difficult and impractical, if not impossible, for each image that may be communicated to be manually reviewed, identified, and removed if necessary in a timely, reproducible, and consistent manner.

In view of the foregoing, there is a need for means to be able to receive an image as input and determine whether it contains imagery that may imply or convey a concept that could be interpreted as an explicit or implicit fiduciary promise. Embodiments disclosed herein can address this need and more.

SUMMARY OF THE DISCLOSURE

Embodiments of the invention disclosed herein may provide solutions to the above problems by providing systems, methods and products that can take an image as input and determine whether the image contains some visual components that may explicitly or implicitly convey a concept such as a fiduciary promise. While exemplary embodiments are described below in the context of detecting images that visually convey the concept of a fiduciary promise, this is illustrative, and alternative embodiments may be configured to detect images that have other conceptual content, such as a threat, a danger, etc. The embodiments disclosed herein achieve these solutions by uniquely combining object detection and classification components which are capable of examining a very large number of images and identifying a smaller subset of those images that contain the concept of interest (e.g., a fiduciary promise).

In embodiments disclosed herein, the invention advantageously leverages the functionalities of object detection and image classification in a unique way. In some embodiments, for object detection, a deep artificial neural network such as a convolutional neural network can be trained to detect the objects that comprise a visual concept of interest such as an explicit or implicit fiduciary promise. The convolutional neural network outputs the types, locations, and number of objects found in the image. These outputs, along with any text detected in the image, are sent to an image classifier which is trained using machine learning. The image classifier determines whether the image is promissory or contains promissory imagery. Based on a result (e.g., a binary answer such as yes or no) from the image classifier, the image can be flagged for manual review.

In some embodiments, images communicated by or on behalf of an organization in the context of providing a regulated service (e.g., a financial service) are aggregated and automatically processed through a convolutional neural network or any appropriate object detection technique to detect objects in the images which, alone or combined, may represent a visual concept of a fiduciary promise (e.g., stacks of dollar bills in a house, sacks of money and a family with children, etc.).

In some embodiments, the convolutional neural network may also identify additional information such as locations of detected objects in the image, labels for the objects, or other metadata. Optionally, optical character recognition can be utilized to extract text from the images. In some embodiments, object detection can be implemented using Detectron built on top of PyTorch.

In some embodiments, outputs from the convolutional neural network (e.g., types/number/location of objects) are provided to a ML classifier adapted for determining whether the collection of detected objects (e.g., a bag of money near a house, an increasing bar graph made of stacked coins, etc.) in an image represents a high-precision indicator of a visual concept or topic of interest (e.g., a fiduciary promise of wealth or money). In some embodiments, the machine learning classifier can be trained to look for combinations of objects that are likely to be promissory, for instance, by comparing labels of dogs and cats with labels of coin stacks, dollar bills, and a human face. In some embodiments, the machine learning classifier can be trained to look for certain scenes or scenarios. This can include, for instance, comparing a person throwing money in the art with a person picking up a dollar bill from a sidewalk. In some embodiments, the machine learning classifier can utilize metadata (e.g., information provided by the convolutional neural network and/or an OCR processor, how big an object is relative to an image, where the object is found in the image, how the object relates to another object(s) in the image, what textual content is found in the image, etc.) to tease out the gray areas. In some embodiments, the machine learning classifier can be implemented using scikit-learn which is a library for machine learning in Python. In the embodiments, the machine learning classifier is configured for providing a binary answer indicating whether an image contains a fiduciary promise.

In some embodiments, the images classified as containing fiduciary promises are flagged and/or presented to a user who can verify whether the visual concept or topic of interest is present. This eliminates the need for intensive manual review and examination of a massive amount of images (e.g., millions per month) to visually identify potential fiduciary promises.

Optionally, the OCR content can be included in the input to the machine learning classifier to expand the type of promissory image that the system can detect. The machine learning classifier is fine-tuned to provide a high recall and high precision outcome. The recall rate is the percentage of promissory images that are detected. Ideally, all of the promissory images will be detected (a recall rate of 100%). The precision of the promissory image detection may be expressed as a ratio of accurately detected images to false positives, so higher precision corresponds to fewer images being falsely identified as promissory images.

With manual reviews, humans are generally more concerned with a higher recall rate at the tradeoff of lower precision. For example, suppose financial advisors provide 1 million images for manual review each month. Of the 1 million images, 100 images are considered promissory images. For a recall rate of 100%, all 1 million images may be flagged. This corresponds to very low precision and lots of false positives for the manual review method. The invention disclosed herein can provide a high recall and high precision outcome in which all 100 images are flagged, while eliminating the need for intensive manual review and examination of most of the remainder of the 1 million images.

In some embodiments, the invention disclosed herein can be applied to video data. For instance, static images can be sampled or obtained from a video and provided to the convolutional neural network as input. As another example, a video object detector may be adapted for detecting objects in images and/or videos (including video streams) using suitable technologies such as deep learning, OpenCV, or Python. Outputs from the video object detector (e.g., a collection of objects in an image, a video, or a portion of the video) can be provided as input to the machine learning classifier for determining whether the collection of detected objects represents a high-precision indicator of a visual concept or topic of interest such as a fiduciary promise.

There may be any different embodiments of the invention. For example, one embodiment comprises a method including, for each of a set of images, generating a visual concept classification of image by examining the image and detecting objects depicted therein, generating a set of object data corresponding to the image, where the set of object data includes information associated with each of the objects, examining the set of object data and generating a classification with respect to a designated visual concept and associating the classification with the image, where the classification identifies the image as either containing the designated visual concept (e.g., a fiduciary promise) or not containing the designated visual concept. If the image is classified as containing the corresponding fiduciary promise, the image is flagged and provided to a user interface that enables manual review of the image by a user. The set of object data may include, for example, an object type, a location, a size, and a confidence level for each of the detected objects. The classification of the image may also be based on metadata that was provided with the image prior to detecting the objects, in addition to the set of object data. The method may be used to identify a subset of an enterprise's messages that contain promissory images. In this case, the method may include receiving a first plurality of messages associated with a business enterprise, identifying a second plurality of image-containing messages which is a reduced subset of the first plurality of messages, extracting images from each of the second plurality of messages, and identifying a third plurality of messages (which is a reduced subset of the second plurality of messages) including images containing the designated visual concept The method may also include training an object detector (e.g., a convolutional neural network) to detect the objects, which may include selecting a set of training images which may contain the designated visual concept and, for each of these images, manually generating an object data set identifying objects contained in the image and pieces of information associated with each of the one or more objects, providing the image to the object detector as an input and providing the corresponding object data set to the object detector as an expected output, and processing the image and the corresponding object data set to train the object detector to detect the corresponding object data set in the image. The training may further include training a visual concept classifier (e.g., a machine learning engine) to classify the object data set by, for each of the images, manually generating a classification for the image with respect to the designated visual concept, providing the object data set and the corresponding classification to the visual concept classifier, and processing the object data set and the corresponding classifier to train the visual concept classifier to detect the corresponding classification from the object data set.

In an alternative embodiment, a system includes an object detector and a visual concept classifier, the object detector being configured to detect objects depicted in an image and generate a corresponding object data set identifying the objects and containing information associated with each of the objects, the visual concept classifier being configured to examine the object data set generated by the object detector, detect combinations of the information in the object data set that are high-precision indicators of the designated visual concept being contained in the image, generate a classification for the object data set with respect to the designated visual concept, and associate the classification with the image, wherein the classification identifies the image as either containing the designated visual concept or not containing the designated visual concept.

Yet another alternative embodiment comprises a computer program product including a non-transitory computer-readable medium storing instructions executable by one or more processors to perform a method in which, for each of a set of images, generating a visual concept classification of image by examining the image and detecting objects depicted therein, generating a set of object data corresponding to the image which includes pieces of information associated with each of the objects, examining the set of object data and generating a classification with respect to a designated visual concept, and associating the classification with the image to identify whether or not the image contains the designated visual concept.

Numerous other embodiments are also possible.

These, and other, aspects of the disclosure and various features and advantageous details thereof are explained more fully with reference to the exemplary, and therefore non-limiting, embodiments illustrated and detailed in the accompanying drawings. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

Figure 1:
FIG. 1 depicts a diagrammatic illustration of the review of an enterprise's messages to ensure compliance with the policies of the enterprise.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

As mentioned above, an enterprise may have to control electronic communications that are associated with the enterprise in order to ensure that the messages comply with the policies of the enterprise. These communications may include communications that are directly related to the business of the enterprise, such as emails sent by its employees in the course of conducting the business of the enterprise. The enterprise may also have to ensure that communications which are directly not related to the enterprise (such as emails, social media posts, etc. which are associated with employees or agents of the enterprise) comply with the enterprise's policies, since these may potentially be viewed as being associated with the enterprise itself. (It should be noted that references to "employees", "agents", and the like are used herein to refer collectively to persons whose communications may be associated with an enterprise and are therefore subject to examination and restriction based on the content of the messages.)

In one example, an enterprise which provides financial services may be obligated to ensure that none of the communications associated with the enterprise or its employees or agents include fiduciary promises, either implicitly or explicitly. Although this example will be used throughout this disclosure to illustrate representative embodiments of the invention, alternative embodiments may be applicable in other contexts in which it is desirable to identify images which convey visual concepts of interest other than fiduciary promises.

For the purposes of this disclosure, a "visual concept" is a representation within an image that conveys a particular concept which is not a specifically identifiable object. For instance, an image that depicts a graph with an increasing slope and dollar signs may convey the concept of a positive return on an investment (which may be considered to be an implied fiduciary promise). This is distinguished from a particular identifiable object within the image, such as a graph or a dollar sign. As used herein, an image may be said to "contain" a visual concept if the image includes pixels which depict imagery representative of the visual concept.

The review of messages to ensure compliance with the policies of the enterprise is graphically illustrated in FIG. 1. As depicted in this figure, all of the messages associated with an enterprise are subject to review to determine whether or not these messages comply with the enterprises obligation not to communicate fiduciary promises. Each message is reviewed to determine whether it contains a fiduciary promise. If a message does not contain a fiduciary promise (i.e., it is a non-promissory message), the message is delivered to its destination. If a message does contain a fiduciary promise (i.e., it is a promissory message), delivery of the message is suspended. Suspension of the message may involve several actions, such as providing a notification to an administrator for the enterprise, providing a notification to the originator of the message, non-delivery of the message, etc. The specific action taken as a result of determining that a message is promissory is beyond the scope of this disclosure, and therefore will not be discussed in detail herein.

As noted above, there may be a very large number of messages that are communicated through or in association with the enterprise, so the task of examining each of these messages to determine whether or not they contain fiduciary promises may be a gargantuan undertaking. For example, if there are 10,000 employees, and each employee sends 100 messages per month, it will be necessary to examine 1 million messages per month to determine whether or not these messages comply with the enterprise's policies. While this task is, for all practical purposes, too large to be performed manually, systems have been developed to enable the automated classification of textual content, so a part of the task may be performed by such systems.

These systems, however, are designed only to examine the textual content of the messages, and they are not capable of identifying conceptual messages such as fiduciary promises which may be expressed by images that are contained within the messages. The images must therefore be separately examined to determine whether or not they convey restricted concepts, such as fiduciary promises. Even if a relatively small percentage of the messages contain images, the total number of images that must be reviewed to identify the restricted concepts may be very large. In the example above, if only 1% of the 1 million messages per month contains an image, there are still 10,000 messages per month that must be manually reviewed. This process is labor-intensive, time-consuming, expensive, inefficient, and simply impractical.

Embodiments disclosed herein use an image classification system to examine all of the images in the messages communicated through the enterprise, and to automatically identify specific ones of the images that have a high likelihood of conveying restricted concepts such as fiduciary promises.

Figure 2:
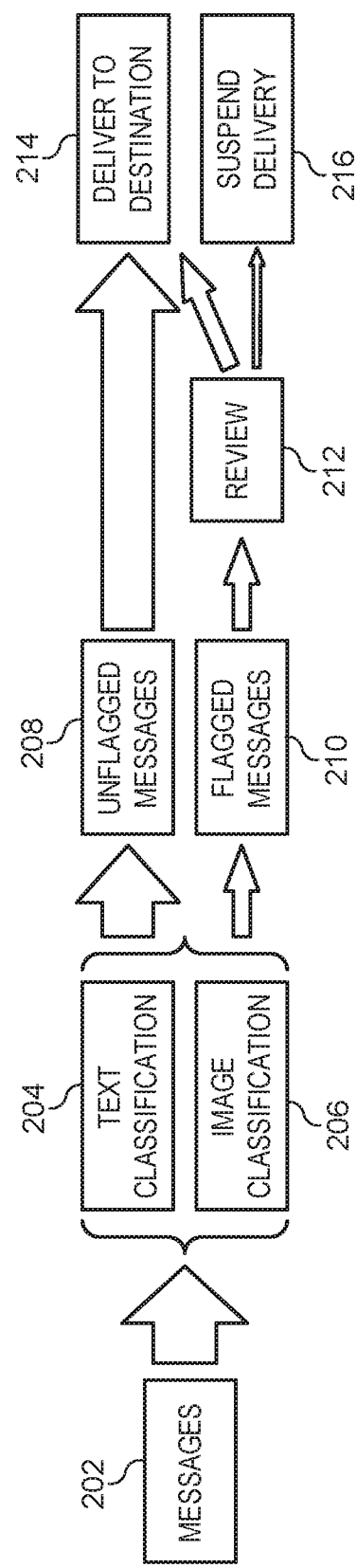
FIG. 2 is a diagrammatic representation of the processing of messages including both text classification and image classification in accordance with some embodiments.

Referring to FIG. 2, a diagrammatic representation of the processing of messages including both text classification and image classification in accordance with some embodiments is shown. As depicted in this figure, a set of messages 202 such as may be associated with an enterprise are provided to a system that includes a text classification subsystem 204 and an image classification subsystem 206, each of which is configured to identify a concept of interest within the message. Text classification subsystem 204 is configured to examine the explicit text of each message and to identify the message as either containing, or not containing, the concept of interest. If text classification subsystem 204 determines that a message contains the concept of interest, the message is flagged (i.e., an indicator associated with the message is set to indicate that the message contains the concept). In some embodiments, text classification subsystem 204 can detect the concept with sufficient confidence that all messages flagged by this subsystem are treated as containing the concept of interest. In other embodiments, the confidence level may be such that flagged messages may require further review (e.g., by an administrator).

Text classification subsystem 204 is not capable of identifying the concept of interest in the message. Image classification subsystem 206, on the other hand, is configured to examine only the images within the message, and to determine whether or not each of the images contains the concept of interest (as a visual concept). For the purposes of this disclosure, "images" should be construed to include still images, videos, or any other type of image. As described in more detail below, image classification subsystem 206 includes components that first detect individual identifiable objects within an image and generate information elements for the identified objects (e.g., labels, bounding boxes, confidence levels, etc.), and components that receive the information generated by the object detection components and classify the identified combination of information elements as either representing or not representing a concept of interest such as a fiduciary promise.

Messages 208 that are not flagged by either text classification subsystem 204 or image classification subsystem 206 may be forwarded to their respective destinations 214. Messages that are identified by text classification subsystem 204 as containing the concept of interest are, in one embodiment, handled as such without requiring further review. For instance, delivery of these messages may be suspended 216 and the originator may be notified, an administrator may be notified, or some other action may be taken. If the concept of interest is identified with a lower confidence level, the message may be flagged for further review 210. If a message is determined by image classification subsystem 206 to have an image containing the concept of interest, the message will normally be flagged 210 for further review 212. This is because the confidence level with which concepts are identified in images is typically not high enough simply to assume that the concept of interest is indeed represented in the image. There may, however, be embodiments in which the confidence level is sufficiently high that messages flagged by image classification subsystem 206 or simply acted upon (e.g., delivery suspended) without further review.

Figure 3:
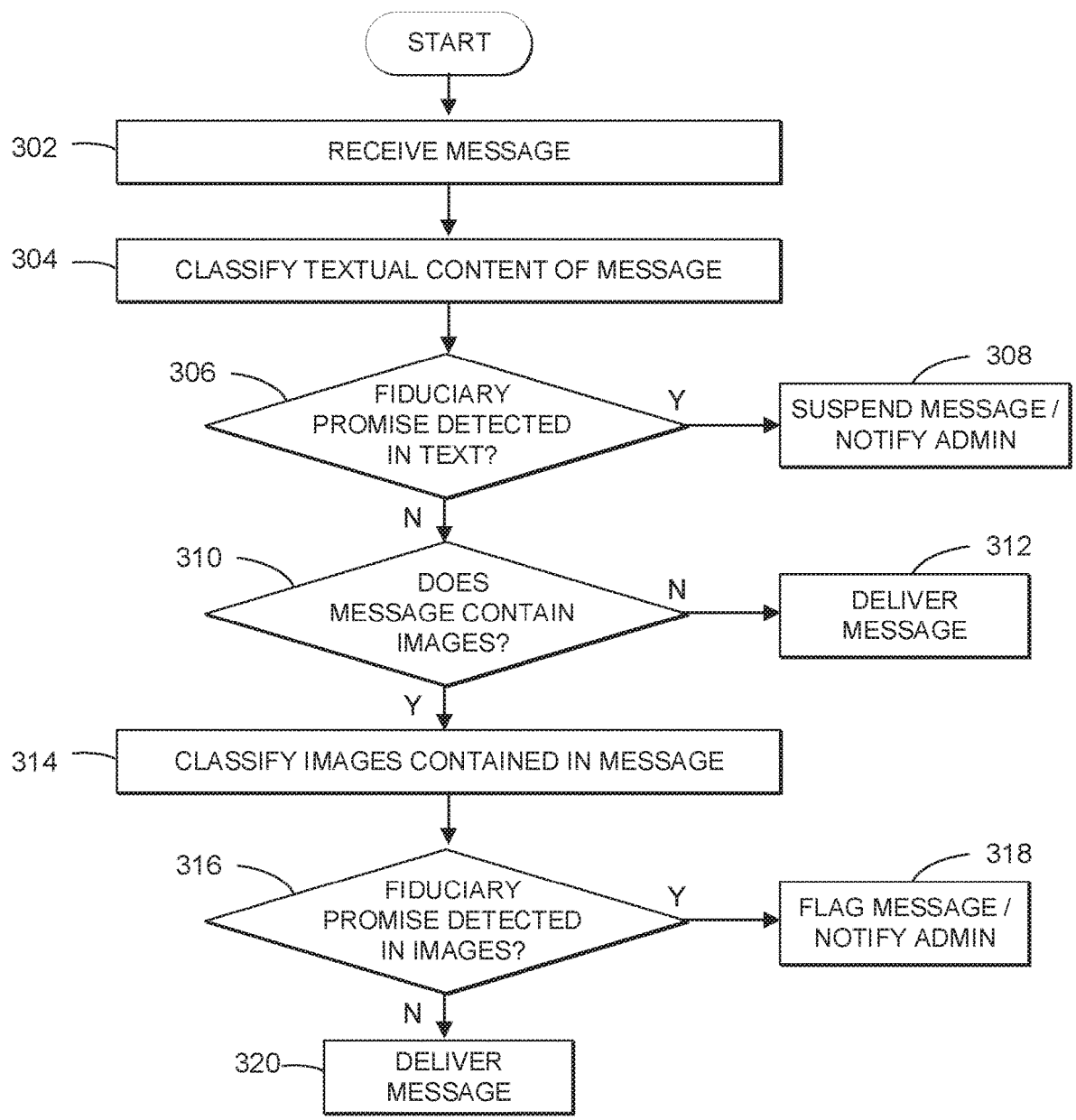
FIG. 3 depicts a flow diagram illustrating a method for classifying messages containing fiduciary promises in both textual content and imagery in accordance with some embodiments.

Referring to FIG. 3, a flow diagram illustrating a method for classifying messages containing fiduciary promises in both textual content and imagery in accordance with some embodiments is shown. In this method, a message is received (302) by a classification system that is configured to detect the visual concept of a fiduciary promise. The system first examines the textual content of the message and classifies this textual content as either: containing a fiduciary promise; or not containing a fiduciary promise (304). The classification of the textual content uses existing methodologies to identify keywords or key phrases, such as "guarantee", "ROI", and the like. Existing text classifiers can identify these keywords and classify the textual content as either promissory or non-promissory with a very high level of confidence. It is assumed in this embodiment that the confidence level of the textual content classification is sufficiently high that, for messages which are determined to contain fiduciary promises, no further manual review is required to confirm this classification.

If the textual content of the message is determined to contain a fiduciary promise (306), delivery of the message to its destination is suspended, and appropriate action can be taken (308). Such action may include notification of the message originator, notification of a system administrator, or such other action as may be appropriate. If the textual content of the message is classified as non-promissory (i.e., the text does not contain a fiduciary promise (306), it is determined whether the message includes one or more images (310). If the message does not contain any images, then the message is forwarded for delivery (312). If the message does contain one or more images (310), the images are provided to an image classification system in order to classify the images (314). As will be discussed in more detail below, the image classification methodology involves the detection of objects within the images and classification of information associated with these objects to determine whether the images contain visual concepts of interest (in this case, fiduciary promises). If one or more of the images contains (i.e., visually conveys) fiduciary promises (316), the message is flagged and an administrator is notified (318). The administrator can then review the message to verify that the images contain a fiduciary promise, in which case delivery of the message can be suspended, and appropriate action taken. If, on the other hand, no fiduciary promises are detected in the images (316), the message is forwarded to its destination (320) without further review.

It should be noted that while the exemplary embodiments explicitly described herein are configured to detect and classify images based on a single visual concept such as a fiduciary promise, alternative embodiments may use several different types of classifiers, each of which is designed to detect messages with images containing a different visual concept. These classifiers may operate in parallel, so that each message is processed by the different classifiers at the same time to classify the message according to whether or not it contains the respective visual concept. For instance, there may be a classifier that detects images containing fiduciary promises, a classifier that detects images containing threats (e.g., threats against a person), a classifier that detects images containing dangers (e.g., tornado or hurricane warnings), and so on. Each of these classifiers may operate in essentially the same manner as described herein with respect to promissory images.

As noted above, processing the enterprise's messages in this manner (including image classification as well as text classification) provides a number of benefits that are not available with existing systems. For instance, the automated classification of images contained in the messages enables the consistent and repeatable identification and flagging of messages that contain images which convey a particular visual concept, such as a fiduciary promise. As a result, the number of messages that must be reviewed by a system administrator is significantly reduced. For instance, the system may be able to determine, with a high confidence level, that 1% of the images that are contained in the messages contain fiduciary promises. Since these messages are flagged by the system, the system administrator will only need to review this 1% of the messages to verify whether or not the images actually contain fiduciary promises (rather than having to review 100% of the messages to make this determination). The system thereby substantially reduces the time, labor and expense which is associated with the manual review of images which would be required to identify these images using existing systems and methods.

As mentioned above, embodiments of the present image classification system use a unique combination of object detection and image classification to determine whether an image contains a visual concept such as a fiduciary promise. Object detection and image classification are two different techniques that are used for different purposes. In general, object detection serves simply identify particular objects in an image and certain information associated with those objects. For example, an object detector might detect a cat or a dog in the image. The object detector might also identify the location of the detected object (e.g., the is found at the center of the image, or within a certain bounding box in the image). The object detector may also be configured to count the number of instances of an object in the image (e.g., the number of cats or dogs found in the image). While an object detector can identify objects in an image, the object detector does not classify the image, does not analyze or determine why the objects are present in the image, and does not identify a visual concept such as an explicit or implicit fiduciary promise.

Image classification is used to classify an image into a certain category or class, typically based on whether or not a particular type of object is found in the image. For instance, an image containing a cat can be classified into a category such as "cats", or "animals". Traditionally, however, image classification does not classify images based on visual concepts that are conveyed in an image, as opposed to specific objects shown in the image. Thus, a conventional image classifier might identify a dollar bill in an image and classify the image in the category of money, but it would not be able to determine whether this object is used to convey the visual concept of a fiduciary promise, and to classify the image accordingly.

A visual concept representing an explicit fiduciary promise might be one that would be interpreted as such by average viewers. For example, an explicit fiduciary promise may be visualized in an image with a banker and a client signing a piece paper and an arrow pointing to a pile of money, or a house filled with bags of money, or a bar graph in which the bars are represented by stacks of coins. These are non-limiting examples, and it is possible to conceive of many different images that may convey a fiduciary promise in different ways. These images may be presented with or without certain textual content (e.g., words such as "bank", "contract", "agreement", "cash", "loan", etc.). A fiduciary promise may be explicit, or it may be implicit, and may still be effective, or interpreted as such, in communicating a fiduciary promise to average viewers. Images that contain fiduciary promises may be referred to herein as "promissory images", and messages containing such images may be referred to herein as "promissory messages". Similarly, images that do not contain fiduciary promises may be referred to herein as "non-promissory images", and messages that do not contain such images may be referred to herein as "non-promissory messages".

Figure 4A:
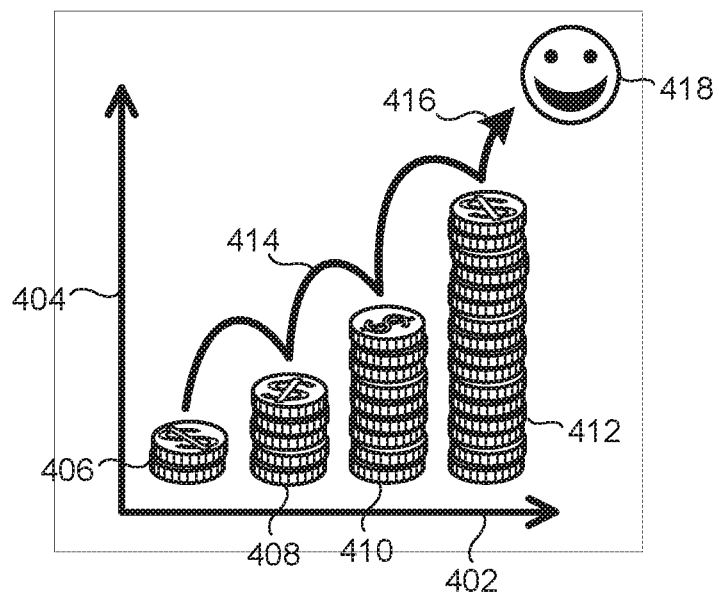
FIGS. 4A and 4B depict an example of an image containing a fiduciary promise.

For purposes of discussion, an example of an image containing a fiduciary promise (i.e., depicting objects which, taken as a whole, convey the visual concept of a fiduciary promise) is illustrated in FIG. 4A. This image includes a number of objects which may play a part in conveying a fiduciary promise. For instance, the image includes horizontal and vertical arrows which form the axes of a graph (402, 404), stacks of coins (406, 408, 410, 412) which form vertical bars of a bar graph, and an upwardly trending line (414) with an arrow (416) pointing to a smiling face (418). These objects, when viewed in combination, may convey to a viewer the idea of increasing wealth or a positive return on an investment. This may be considered a fiduciary promise. If this image is included in a message associated with a financial services enterprise, the enterprise may have a legal obligation to prevent communication of the image and the corresponding fiduciary promise.

Embodiments disclosed herein include an object detection component which is trained to examine images and identify objects and associated information within the images, as well as an image classification component which is trained to receive the object information identified by the object detection component and to classify the images as either containing or not containing a particular visual concept such as a fiduciary promise based upon the particular combinations of information which are derived from the images. An exemplary image classification system which is configured to identify fiduciary promises in images is depicted in the diagram of FIG. 5.

Figure 5:
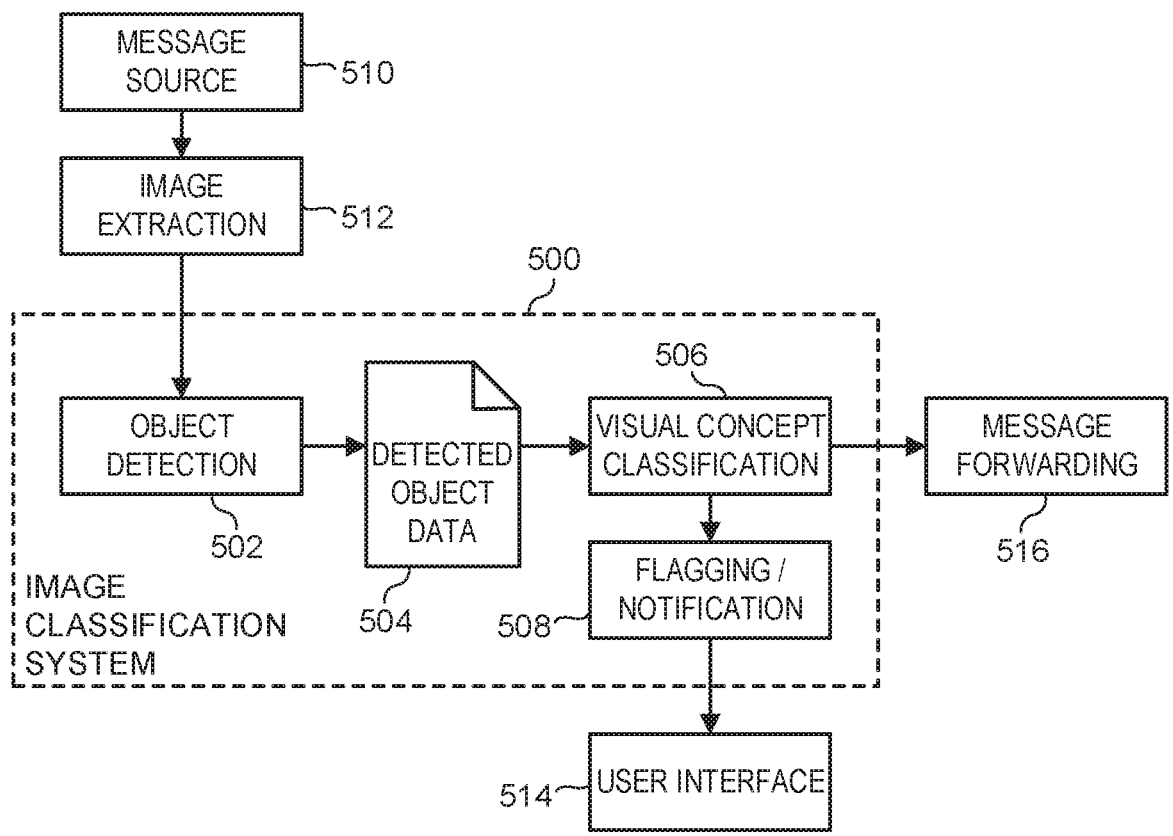
FIG. 5 depicts a diagrammatic representation of an exemplary image classification system which is configured to identify fiduciary promises in images in accordance with some embodiments.

In the embodiment of FIG. 5, and image classification system 500 includes object detection component 502 and visual concept classification component 506. As discussed above, an enterprise may monitor various different types of messages which are communicated through the enterprise by its various employees and agents. Message source 510 may include any or all of the sources from which enterprise-associated messages originate. When a message containing an image is identified, it is provided to an image extractor 512 which extracts the image from the message and provides the image to object detector 502. Object detector 502 examines the image and detects one or more objects that are contained in (depicted in) the image. For instance, referring to the example of FIG. 4A, the object detector may detect graphs, axes, coins, arrows, dollar signs, smiling faces, etc. Object detector 502 may also derive from the image various types of information associated with each of the objects, such as the number of objects, the locations of the objects, confidence levels associated with identification of the objects, and so on.

The object information 504 which is generated by object detector 502 as an output is provided as an input to visual concept classifier 506. Visual concept classifier 506 may also receive metadata associated with the image (e.g., filename, label, geotag, etc.), where the metadata was originally provided with the image, rather than being generated by object detector 502. Visual concept classifier 506 uses this object data, rather than the image itself, to determine a classification associated with the image. In one example, the image is classified as either promissory (containing a fiduciary promise) or non-promissory (not containing a fiduciary promise). If visual concept classifier 506 classifies the image as non-promissory, it does not flag the image and/or corresponding message and allows the message to be forwarded (516) to the destination indicated by the message originator (assuming that the message does not contain other images or textual content that is restricted). If the visual concept classifier classifies the image as promissory, the image and/or corresponding message is flagged (508), and a notification is provided to user interface 514. In one embodiment, the notification provides an indication to an administrator that the image should be reviewed for verification of the promissory status of the image/message.

Figure 6:
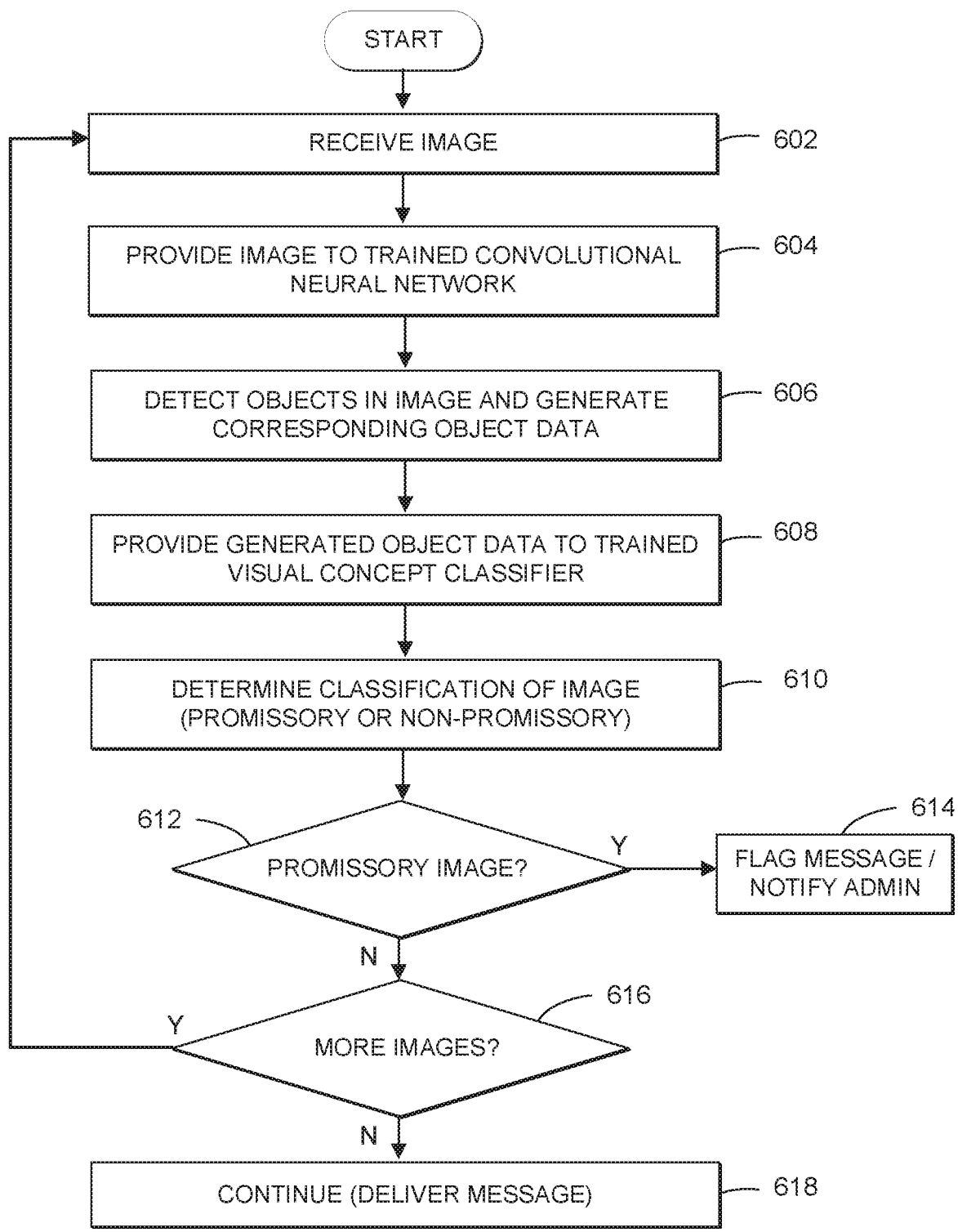
FIG. 6 depicts a flow diagram illustrating a method implemented by an image classification system in accordance with some embodiments.

The method implemented by the image classification system is illustrated in the flow diagram of FIG. 6. In this figure, an image is received (602) by the system and is provided to a trained convolutional neural network (604). The convolutional neural network has been trained to identify particular types of objects which are considered to be relevant to the type of visual concept (e.g., a fiduciary promise) which is of interest. The convolutional neural network detects these objects within the image and generates corresponding data for the detected objects (606). For instance, in one embodiment, the convolutional neural network identifies the type of each object, the location and size of each object (e.g., specifying a bounding box within the image that contains the corresponding object), and a confidence level associated with each object (the confidence level being a number between 0 and 1 indicating the confidence or certainty with which the corresponding object has been identified).

Figure 4B:
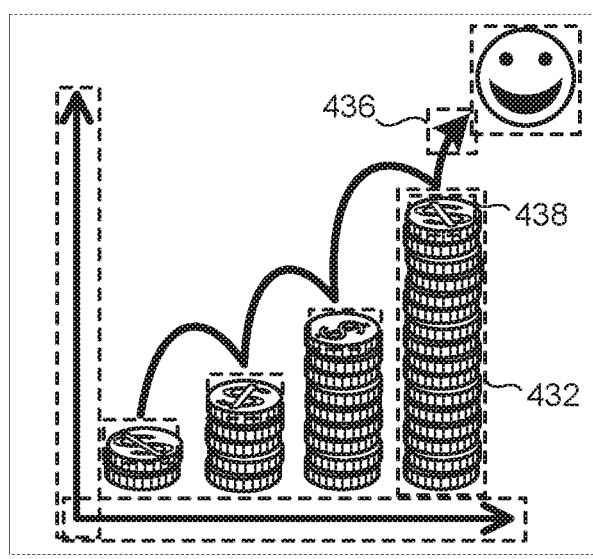

An example of the detection of objects within an image is illustrated in FIG. 4B. This figure shows the image of FIG. 4A, with several of the objects identified by corresponding bounding boxes. (It should be noted that, for purposes of clarity, the figure does not include bounding boxes for all of the objects.) For instance, the convolutional neural network may identify a stack of coins within box 432, an arrow within box 436 and a dollar sign within box 438. The convolutional neural network generates corresponding object data such as, for example:

Object 1
      type: coins
      location: (74,11)
      size: (14,62)
      confidence: 0.74
    Object 2
      type: arrow
      location: (82,85)
      size: (11,10)
      confidence: 0.98
    Object 3
      type: dollar sign
      location: (75,59)
      size: (14,9)
      confidence: 0.41
. . .

In this example, the location is specified by a pair of numbers identifying the lower, left-hand corner of the bounding box around the object. For instance, the bounding box 332 around the coins begins at pixels 74 (X direction) and 11 (Y direction). The size of the bounding box is also specified in pixels, with box 332 being 14 pixels wide and 62 pixels high. The convolutional neural network has identified the coins in this example with a confidence of 0.74. It should be noted that this format for the object information is merely illustrative, and various embodiments may use different schemes to convey object information (both the specific types of information which are included and the format of the information).

The object data generated by the convolutional neural network is provided as an input to the trained visual concept classifier (608). The image itself is not provided as an input to the classifier. The visual concept classifier uses machine learning to enable the classifier to be trained to recognize visual concepts based on data associated with objects in the image. While the visual concept classifier may use a convolutional neural network, this is not necessary, and other types of machine learning systems may be used. (Although machine learning systems other than convolutional neural networks may be used for the object detector, it is generally understood that convolutional neural networks have the best performance in recognizing image features.)

Based upon the received object data, the visual concept classifier determines a classification of the image that is associated with the object data (610). In this case, the image is classified as either promissory (i.e., containing a fiduciary promise) or non-promissory (i.e., not containing a fiduciary promise). If the image is promissory (612), the image and/or the message that contains the image is flagged and a notification is provided to an administrator (614) so that the administrator can review the image to confirm that the image is promissory. If it is confirmed by the reviewer that the image is promissory, the corresponding message can be handled appropriately (e.g., delivery suspended, originator notified, etc.) if the reviewer determines that the image is not promissory, the image can be unflagged and, if there are no other indications that the corresponding message should be suspended, it can be delivered as indicated by the message originator. If the visual concept classifier classifies the image as non-promissory, it will be determined whether there are additional images in the message (616) and, if so, the next one of these images will be processed in the same manner to determine its classification (promissory or non-promissory). If there are no additional images in the message (616), the system can continue with delivery of the message (618) again, assuming that there are no other indicators that the message contains a fiduciary promise.

Figure 7A:
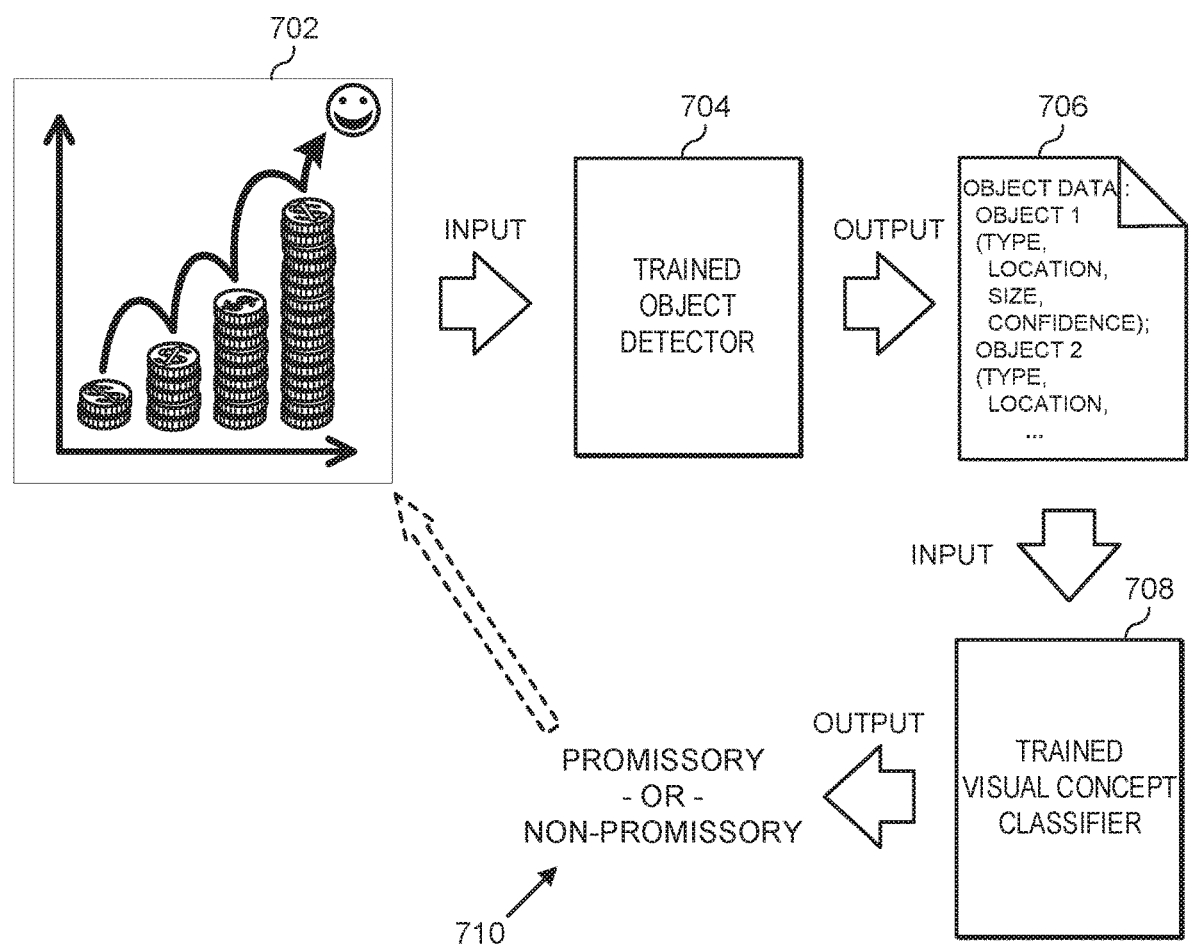
FIGS. 7A and 7B are graphical illustrations of the operation of an image classification system in accordance with some embodiments.

Referring to FIG. 7A, a graphical illustration of the operation of the image classification system in accordance with some embodiments is shown. As depicted in this figure, an image 702 is provided to trained object detector 704. The object detector processes the image and generates an output data set 706 which identifies each of the relevant objects in the image (e.g., graph axes, coins, arrows, smiling faces, etc.) and provides associated object information (e.g., type, location, size, confidence, etc.). Output data set 706 is then provided as an input to trained visual concept classifier 708. Visual concept classifier 708 processes data set 706 and generates a classification 710 based on the received object data. Classification 710 is then associated with image 702.

Figure 7B:
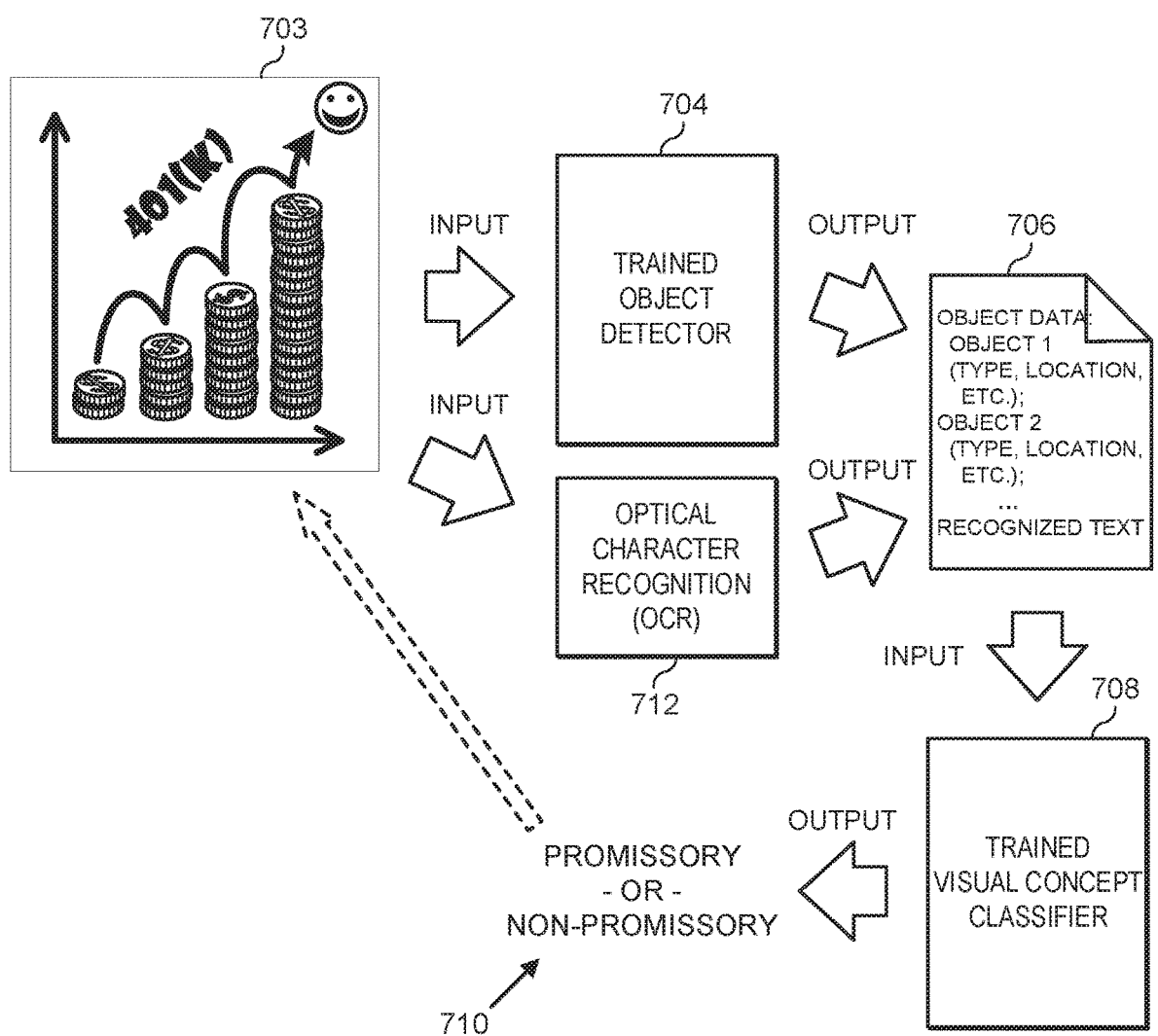

The embodiment of the image classification system described in FIG. 7A detects graphical objects in the image and generates data set 706 based upon the detected graphical objects. It should be noted that some images may contain graphical representations of text, so it may be useful to perform optical character recognition (OCR) on the image in order to extract this text, which can then be used in the classification of the image. FIG. 7B is an illustration of the operation of an embodiment of the image classification system which performs OCR on the image. In this embodiment, image 703 includes text which is graphically represented in the image. Image 703 is input to both trained object detector 704 and optical character recognition module 712. Object detector 704 detects objects within the image and generates corresponding object data as an output. Optical character recognition module 712 detects characters within the image (in this case, "401(k)") and generates text corresponding to the graphically represented characters. In some cases, the generated text may be processed to extract keywords that are relevant to the visual concept of interest (e.g., a fiduciary promise), and these words may be added to the object data generated by object detector 704 to produce data set 706. In other embodiments, all of the recognized text may be added to the data set. In still other embodiments, the recognized text may be separately classified to determine whether this text, standing on its own, contains a fiduciary promise. As in FIG. 7A, data set 706 is provided as input to visual concept classifier 708, which generates a classification 710 based on the received data. This classification is then associated with image 703.

Figure 8:
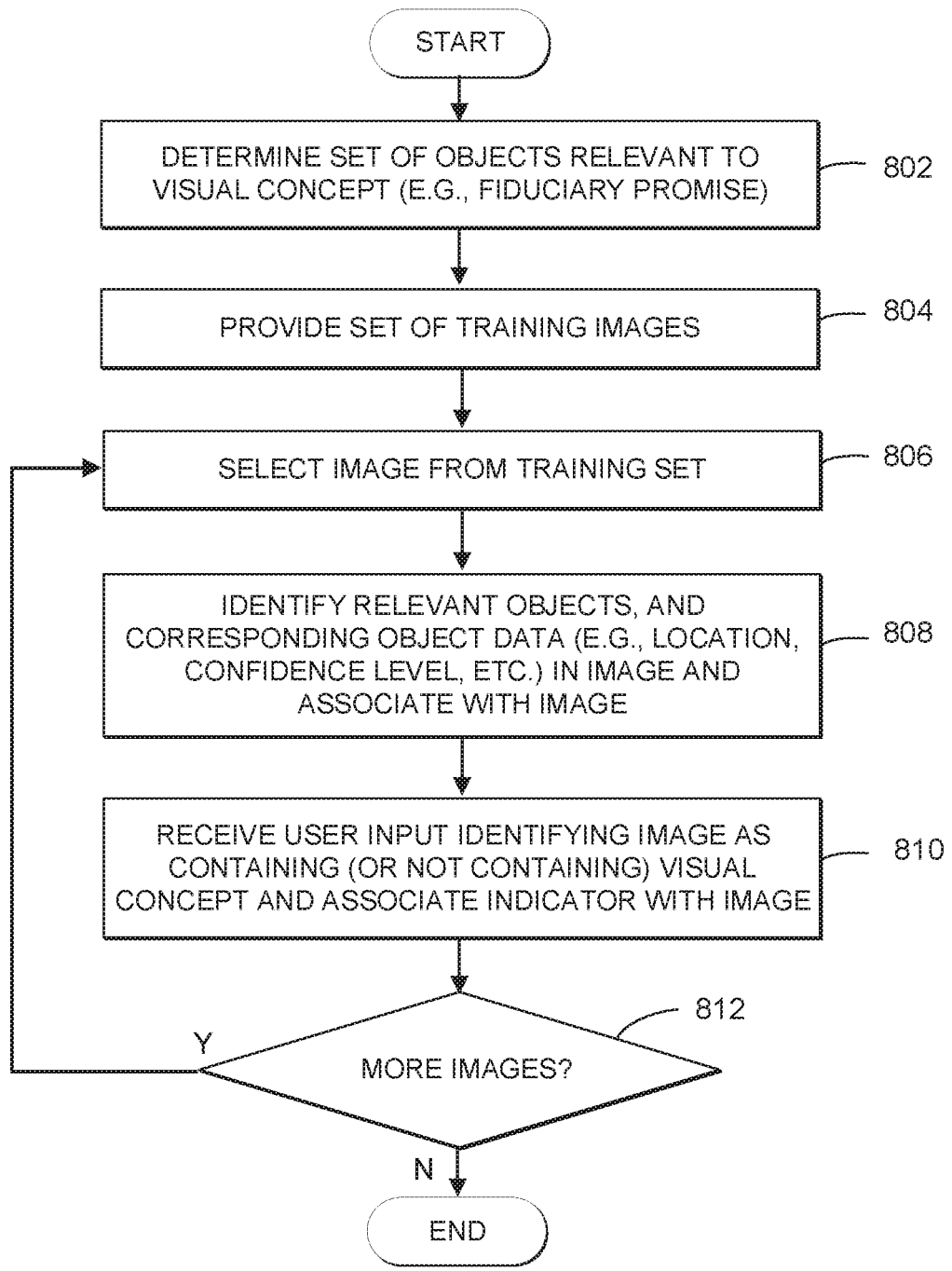
FIG. 8 depicts a flow diagram illustrating a method for generating a set of training data in accordance with some embodiments.

As noted above, the object detector used in embodiments of the present invention is trained to detect objects which are relevant to the specific visual concept which is of interest. Similarly the visual concept classifier is trained to identify-precision combinations of object data which indicate that an image conveys this concept of interest. The training of the object detector and visual concept classifier in accordance with some embodiments is described below in connection with FIGS. 8 and 9. FIG. 8 illustrates a method for generating a set of training data, and FIG. 9 illustrates a method for training the object detector and visual concept classifier using the generated training data.

Referring to FIG. 8, a set of objects which are relevant to the visual concept of interest is initially generated (802). In the examples above, in which a financial services enterprise wishes to classify images according to whether or not they contain a fiduciary promise, the relevant objects may include such things as coins, currency, dollar signs, graphs, charts, arrows, gold, jewels, and the like. The set of relevant objects typically would not include things which a viewer would be unlikely to associate with a fiduciary promise, such as animals, balls, appliances, etc. A set of training images is then collected (804). The images in the training set should include both images that include the visual concept of interest and those that do not. Preferably, all of the images in the training set will contain objects relevant to the visual concept of interest, even if they do not convey the visual concept of interest. For instance, an image of a dollar sign with wings includes relevant objects (e.g., a dollar sign), but the image may convey the concept of losing money rather than a fiduciary promise.

A first image is then selected from the training set (806), and objects that are included in the set of relevant objects are identified within the image (808). For example, objects such as dollar signs, currency, coins, etc. are each identified. For each of the identified objects, corresponding object information such as the type of the object, location of the object and size of the object is provided (810). In one embodiment the object data is input by a user. The user also provides an indication of the classification of the image that denotes whether or not the image contains the visual concept of interest (810). The object data and the classification indicator are stored in a data object which is associated with the image. This process is repeated for each of the images (812). When the process is complete, each image in the training set will have an associated set of object data and a classification.

Figure 9:
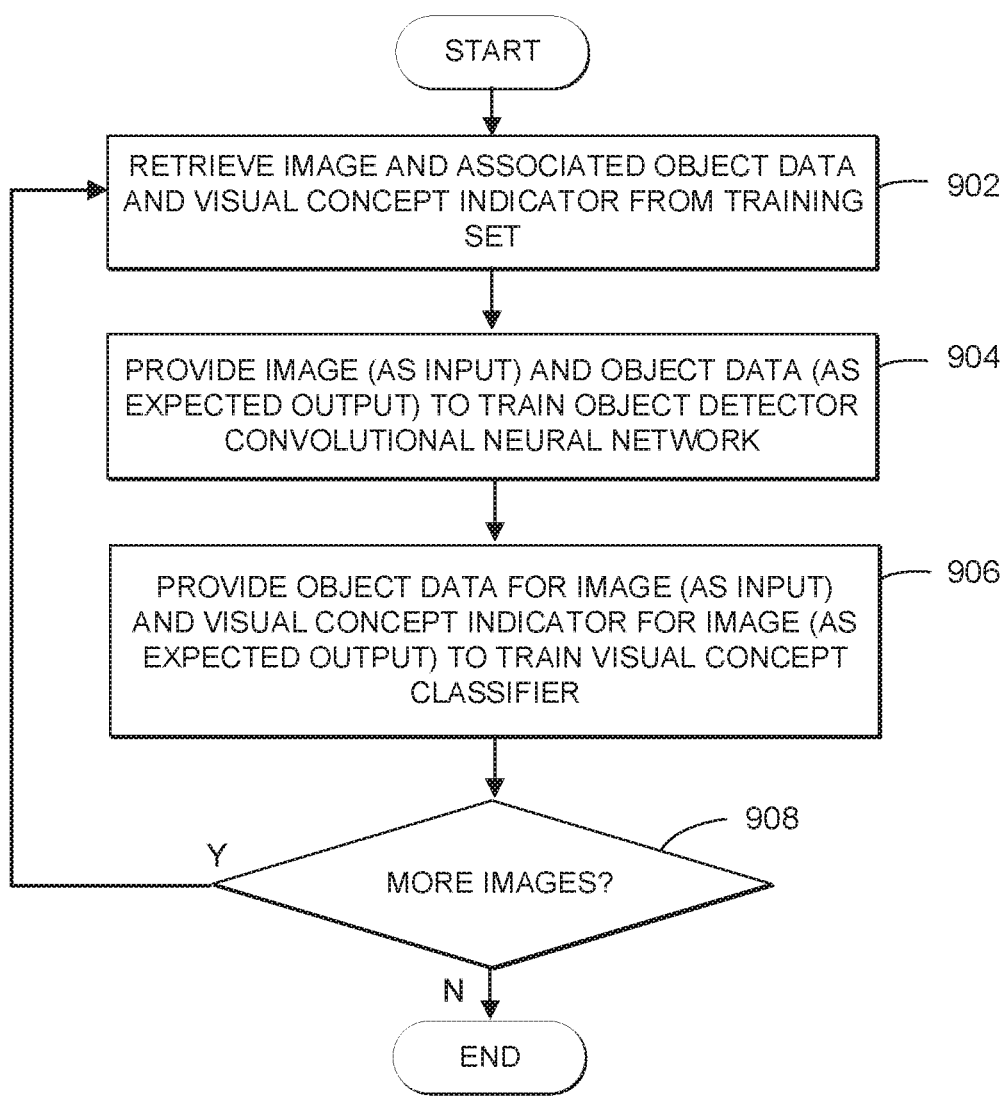
FIG. 9 depicts a flow diagram illustrating a method for training an object detector and visual concept classifier using the generated training data in accordance with some embodiments.

Referring to FIG. 9, an exemplary method for training the object detector and visual concept classifier is shown. This method uses the training data set generated, for example, according to the method of FIG. 8. In this method, an image and the associated object data are retrieved from the data set (902). The image and the object data are provided to the convolutional neural network of the object detector (904). The image is provided as an input to the convolutional neural network, and the object data is provided as an expected output of the neural network. After processing the image, the output of the neural network (e.g., identified object information) is compared to the expected output, and corrections are made to filter weights used in the convolutional layers of the neural network in order to increase the neural network's recognition accuracy. This portion of the training process is well known and will not be explained in further detail here. The object data for the image (which was provided as an expected output to the object detector) is provided as an input to the visual concept classifier, and the user-identified classification is provided to the classifier as an expected output (906). The image itself is not used in the training of the visual concept classifier. The training of the visual concept classifier is similar to the training of the object detector, in that the visual concept classifier processes the received object data and generates an output classification, which is then compared to the expected classification so that weighting coefficients used by the classifier can be corrected to improve the classification accuracy. Again, this is a well-known portion of the process and will not be discussed in further detail here. After the image and corresponding object in classification data have been used to train the object detector and visual concept classifier, the process is repeated (908) for each image (and corresponding object and classification information) in the training data set. After the object detector and visual concept classifier have been trained based on the training data set, they may be used to classify images as previously described.

Figure 10:
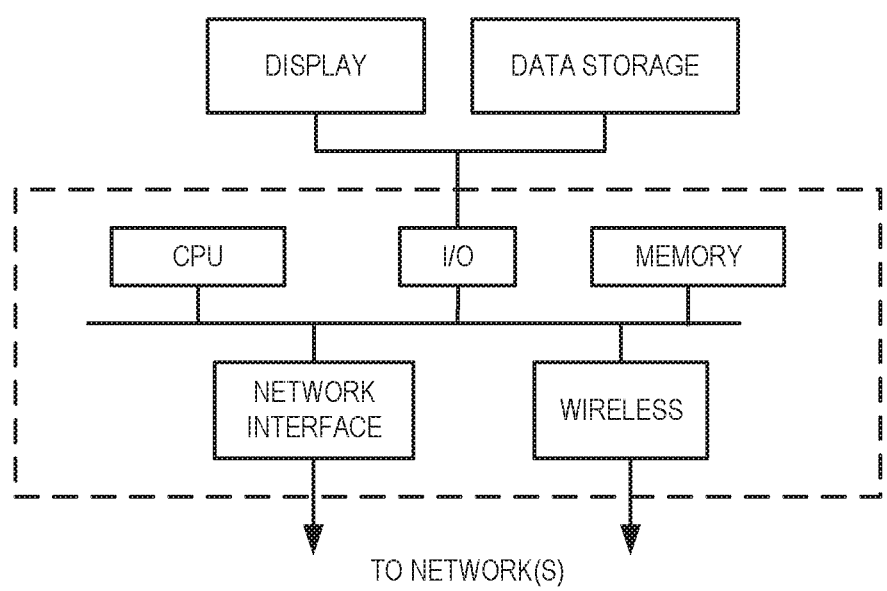
FIG. 10 depicts a diagrammatic representation of the structure of an exemplary computer in which some embodiments may be implemented.

Embodiments discussed herein can be implemented in a computer communicatively coupled to a network (for example, the Internet), another computer, or in a standalone computer. As illustrated in FIG. 10, a suitable computer can include a central processing unit ("CPU"), a computer memory such as a read-only memory ("ROM"), random access memory ("RAM"), hard drive ("HD"), and one or more input/output ("I/O") device(s). The I/O devices, which can be coupled to a display and a data storage device, can include a keyboard, monitor, printer, electronic pointing device (for example, mouse, trackball, stylus, touch pad, etc.), or the like. In embodiments of the invention, the computer has a network interface and a wireless component for communicating with other computing devices over various types of networks.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the accompanying drawings, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and in the accompanying drawings, the meaning of "in" includes "in" and "on" unless the context clearly dictates otherwise.

It will also be appreciated that one or more of the elements depicted in the accompanying drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

What is claimed is:

1. A method comprising:
    for each of one or more images, generating a visual concept classification of each image by:
        training an object detector to detect the one or more objects, the object detector comprising a convolutional neural network, the training including
            selecting a set of training images, wherein each training image contains one or more objects associated with the designated visual concept, wherein each training image in a first subset of the training images contains the designated visual concept, and wherein each training image in a second subset of the training images does not contain the designated visual concept, and
            for each of the images in the set of training images, generating an object data set identifying one or more objects contained in the image and one or more pieces of information associated with each of the one or more objects,
            providing the image to the object detector as an input and providing the corresponding object data set to the object detector as an expected output, and
            processing the image and the corresponding object data set by the object detector, thereby training the object detector to detect the corresponding object data set in the image;
        examining the image and detecting a set of objects depicted therein;
        generating a set of object data corresponding to the objects depicted in the image, wherein the set of object data includes one or more pieces of information associated with each object in the set of objects;
        examining the set of object data and generating a classification for the set of object data with respect to a designated visual concept; and
        associating the classification with the image, wherein the classification identifies the image as either containing the designated visual concept or not containing the designated visual concept.

2. The method of claim 1, wherein the designated visual concept comprises a corresponding fiduciary promise.

3. The method of claim 2, further comprising, for each of one or more images, when the image is classified as containing the corresponding fiduciary promise, flagging the image and providing the flagged image to a user interface that enables manual review of the image by a user.

4. The method of claim 1, wherein the first set of object data includes, for each of the one or more detected objects: an object type; a location; a size, and a confidence level.

5. The method of claim 4, wherein the first set of object data includes one or more metadata items that are associated with the image prior to detecting the one or more objects depicted in the image.

6. The method of claim 1, further comprising training a visual concept classifier to classify the object data set, the visual concept classifier comprising a machine learning engine, the training comprising,
    for each of the images in the set of training images,
        generating a classification for the image with respect to the designated visual concept,
        providing the object data set and the corresponding classification to the visual concept classifier, and
        processing the object data set and the corresponding classifier by the visual concept classifier, thereby training the visual concept classifier to detect the corresponding classification from the object data set.

7. The method of claim 1, further comprising:
    receiving a first plurality of messages associated with a business enterprise;
    identifying a second plurality of image-containing messages, wherein the second plurality of image-containing messages is a reduced subset of the first plurality of messages;
    extracting from each message of the second plurality of messages at least one of the one or more images; and
    designating a third plurality of messages containing the designated visual concept, wherein each message of the third plurality of messages contains one of the one or more images containing the designated visual concept, wherein the third plurality of messages is a reduced subset of the second plurality of messages.

8. A system for detecting a designated visual concept in an image,
    the system comprising:

an object detector having a convolutional neural network which is trained to detect the one or more objects, the object detector configured to receive the image, detect a set of objects depicted therein, and generate an object data set corresponding to the objects depicted in the image, wherein the object data set includes one or more pieces of information associated with each object in the set of objects; and a visual concept classifier configured to
receive the object data set from the object detector, examine the object data set,
detect ones or combinations of the pieces of information in the object data set that are high-precision indicators of the designated visual concept being contained in the image,
generate a classification for the object data set with respect to the designated visual concept, and
associate the classification with the image, wherein the classification identifies the image as either containing the designated visual concept or not containing the designated visual concept, wherein the object detector is trained by
selecting a set of training images, wherein each training image contains one or more objects associated with the designated visual concept, wherein each training image in a first subset of the training images contains the designated visual concept, and wherein each training image in a second subset of the training images does not contain the designated visual concept,
generating an object data set identifying one or more objects contained in the image and one or more pieces of information associated with each of the one or more objects,
providing the image to the object detector as an input and providing the corresponding object data set to the object detector as an expected output, and
processing the image and the corresponding object data set by the object detector, thereby training the object detector to detect the corresponding object data set in the image;

wherein the visual concept classifier comprises a machine learning engine which is trained to classify the object data set, the training comprising, for each of the images in the set of training images,
generating a classification for the image with respect to the designated visual concept,
providing the object data set and the corresponding classification to the visual concept classifier, and
processing the object data set and the corresponding classifier by the visual concept classifier, thereby training the visual concept classifier to detect the corresponding classification from the object data set.

9. The system of claim 8, wherein the designated visual concept comprises a corresponding fiduciary promise, and wherein the visual concept classifier is further configured to, when the image is classified as containing the corresponding fiduciary promise, flag the image and provide the flagged image to a user interface that enables manual review of the image by a user.

10. The system of claim 8, wherein the first set of object data includes, for each of the one or more detected objects: an object type; a location; a size, and a confidence level.

11. The system of claim 10, wherein the first set of object data includes one or more metadata items that are associated with the image prior to detecting the one or more objects depicted in the image.

12. The system of claim 8, wherein the system is configured to
receive a first plurality of messages associated with a business enterprise;
identify a second plurality of image-containing messages, wherein the second plurality of image-containing messages is a reduced subset of the first plurality of messages;
extract from each message of the second plurality of messages at least one of the one or more images; and
designate a third plurality of messages containing the designated visual concept, wherein each message of the third plurality of messages contains one of the one or more images containing the designated visual concept, wherein the third plurality of messages is a reduced subset of the second plurality of messages.

13. A computer program product comprising a non-transitory computer-readable medium storing instructions executable by one or more processors to perform:
training an object detector to detect the one or more objects, the object detector comprising a convolutional neural network, the training including
selecting a set of training images, wherein each training image contains one or more objects associated with the designated visual concept, wherein each training image in a first subset of the training images contains the designated visual concept, and wherein each training image in a second subset of the training images does not contain the designated visual concept, and
for each of the images in the set of training images,
generating an object data set identifying one or more objects contained in the image and one or more pieces of information associated with each of the one or more objects,
providing the image to the object detector as an input and providing the corresponding object data set to the object detector as an expected output, and
processing the image and the corresponding object data set by the object detector, thereby training the object detector to detect the corresponding object data set in the image; and
training a visual concept classifier to classify the object data set, the visual concept classifier comprising a machine learning engine, the training comprising,
for each of the images in the set of training images,
generating a classification for the image with respect to the designated visual concept,
providing the object data set and the corresponding classification to the visual concept classifier, and
processing the object data set and the corresponding classifier by the visual concept classifier, thereby training the visual concept classifier to detect the corresponding classification from the object data set;
for each of one or more images, generating a visual concept classification of each image by:
examining the image and detecting a set of objects depicted therein;
generating a set of object data corresponding to the objects depicted in the image, wherein the set of object data includes one or more pieces of information associated with each object in the set of objects;
examining the set of object data and generating a classification for the set of object data with respect to a designated visual concept; and associating the classification with the image, wherein the classification identifies the image as either containing the designated visual concept or not containing the designated visual concept.

14. The computer program product of claim 13, wherein the designated visual concept comprises a corresponding fiduciary promise; wherein the instructions are further executable by the one or more processors to perform, for each of one or more images, when the image is classified as containing the corresponding fiduciary promise, flagging the image and providing the flagged image to a user interface that enables manual review of the image by a user.

15. The computer program product of claim 13, wherein the first set of object data includes, for each of the one or more detected objects: an object type; a location; a size, and a confidence level.

16. The computer program product of claim 15, wherein the first set of object data includes one or more metadata items that are associated with the image prior to detecting the one or more objects depicted in the image.

17. The computer program product of claim 13, wherein the instructions are further executable by the one or more processors to perform:

- receiving a first plurality of messages associated with a business enterprise;
- identifying a second plurality of image-containing messages, wherein the second plurality of image-containing messages is a reduced subset of the first plurality of messages;
- extracting from each message of the second plurality of messages at least one of the one or more images; and
- designating a third plurality of messages containing the designated visual concept, wherein each message of the third plurality of messages contains one of the one or more images containing the designated visual concept, wherein the third plurality of messages is a reduced subset of the second plurality of messages.

* * * * *